US011865719B2

(12) United States Patent
Nakamoto et al.

(10) Patent No.: US 11,865,719 B2
(45) Date of Patent: Jan. 9, 2024

(54) WORK SUPPORT DEVICE, WORK SUPPORT METHOD, COMPUTER PROGRAM PRODUCT, AND WORK SUPPORT SYSTEM

(71) Applicant: KABUSHIKI KAISHA TOSHIBA, Tokyo (JP)

(72) Inventors: Hideichi Nakamoto, Tokyo (JP); Akihito Ogawa, Fujisawa Kanagawa (JP); Junichiro Ooga, Kawasaki Kanagawa (JP); Hideki Ogawa, Tokyo (JP); Haruna Eto, Kawasaki Kanagawa (JP); Ryosuke Higo, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 222 days.

(21) Appl. No.: 17/005,365

(22) Filed: Aug. 28, 2020

(65) Prior Publication Data
US 2021/0170589 A1 Jun. 10, 2021

(30) Foreign Application Priority Data

Dec. 9, 2019 (JP) .................................. 2019-222378

(51) Int. Cl.
*B25J 9/16* (2006.01)
*B25J 9/04* (2006.01)
(Continued)

(52) U.S. Cl.
CPC .............. *B25J 9/1651* (2013.01); *B25J 9/04* (2013.01); *B25J 9/1674* (2013.01); *B25J 9/1694* (2013.01);
(Continued)

(58) Field of Classification Search
CPC . B25J 9/04; B25J 9/1651; B25J 9/1674; B25J 9/1694; B25J 13/085; B25J 13/088; B25J 17/02; B25J 19/0004; B66F 11/046
See application file for complete search history.

(56) References Cited

U.S. PATENT DOCUMENTS 5,200,674 A * 4/1993 Fujimoto .............. B66F 11/046
318/105
5,286,159 A * 2/1994 Honma ................. B66F 11/046
182/2.11
(Continued)

FOREIGN PATENT DOCUMENTS

DE 20 2019 105 217 U1 11/2019
JP H6-40679 A 2/1994
(Continued)

*Primary Examiner* — Dale Moyer
(74) *Attorney, Agent, or Firm* — Finnegan, Henderson, Farabow, Garrett & Dunner, LLP

(57) ABSTRACT

According an embodiment, a work support device includes an arm unit, a brake unit, a state determination unit, and a brake control unit. The arm unit includes a grasping part configured to grasp an object, a plurality of joint parts, and a plurality of link parts actuatably coupled through each joint part. The brake unit is provided to at least one of the joint parts to restrict actuation of the arm unit. The state determination unit determines the state of the arm unit. The brake control unit controls the brake unit to restrict actuation of the arm unit in accordance with the state of the arm unit.

14 Claims, 13 Drawing Sheets

(51) Int. Cl.
*B25J 13/08* (2006.01)
*B25J 17/02* (2006.01)
*B25J 19/00* (2006.01)

(52) U.S. Cl.
CPC .......... *B25J 13/085* (2013.01); *B25J 13/088* (2013.01); *B25J 17/02* (2013.01); *B25J 19/0004* (2013.01)

(56) References Cited

U.S. PATENT DOCUMENTS

| | | | | |
|---|---|---|---|---|
| 7,158,112 | B2* | 1/2007 | Rosenberg | A63F 13/812 345/156 |
| 2001/0055525 | A1* | 12/2001 | Inokuchi | B25J 5/06 414/730 |
| 2004/0148058 | A1* | 7/2004 | Johannessen | B25J 13/06 700/245 |
| 2007/0118249 | A1* | 5/2007 | Nagamatsu | B25J 9/1666 700/248 |
| 2009/0216378 | A1* | 8/2009 | Murayama | B66C 23/005 700/275 |
| 2011/0010012 | A1* | 1/2011 | Murayama | G05B 19/423 700/260 |
| 2011/0060462 | A1 | 3/2011 | Aurnhammer et al. | |
| 2011/0245970 | A1* | 10/2011 | Wells | B25J 19/0095 700/245 |
| 2013/0046409 | A1* | 2/2013 | Tanaka | B25J 9/103 74/421 A |
| 2014/0107843 | A1 | 4/2014 | Okazaki | |
| 2017/0007336 | A1 | 1/2017 | Tsuboi et al. | |
| 2017/0217009 | A1* | 8/2017 | Angold | B25H 1/0042 |
| 2017/0326738 | A1* | 11/2017 | Christiansen | F16M 13/02 |
| 2018/0361578 | A1* | 12/2018 | Muneto | B25J 9/1605 |
| 2019/0247994 | A1* | 8/2019 | Angold | B25J 1/02 |
| 2021/0040757 | A1* | 2/2021 | Abadi | B25J 5/00 |
| 2021/0078827 | A1 | 3/2021 | Ogawa et al. | |

FOREIGN PATENT DOCUMENTS

| | | |
|---|---|---|
| JP | 5695223 B2 | 4/2015 |
| JP | 6591641 B1 | 10/2019 |
| JP | 2021-42073 A | 3/2021 |
| WO | WO 2015/137038 A1 | 9/2015 |

* cited by examiner

_US 11,865,719 B2_

WORK SUPPORT DEVICE, WORK SUPPORT METHOD, COMPUTER PROGRAM PRODUCT, AND WORK SUPPORT SYSTEM

CROSS-REFERENCE TO RELATED APPLICATIONS

This application is based upon and claims the benefit of priority from Japanese Patent Application No. 2019-222378, filed on Dec. 9, 2019; the entire contents of which are incorporated herein by reference.

FIELD

Embodiments described herein relate generally to a work support device, a work support method, a computer program product, and a work support system.

BACKGROUND

Devices that support work such as assembly work and installation work of a heavy object have been known. For example, in a disclosed configuration, a workpiece weight for balancing with the weight of a workpiece as a heavy object is provided at an end part of an arm that supports the workpiece.

However, by the conventional technology, there are cases where a workpiece weight disturbs the work, and it has been difficult to support work while avoiding various interferers in a given region such as the inside of a passage. In other words, by the conventional technology, there are difficult cases of achieving improved work support.

DETAILED DESCRIPTION

According an embodiment, a work support device includes an arm unit, a brake unit, a state determination unit, and a brake control unit. The arm unit includes a grasping part configured to grasp an object, a plurality of joint parts, and a plurality of link parts actuatably coupled through each joint part. The brake unit is provided to at least one of the joint parts to restrict actuation of the arm unit. The state determination unit is configured to determine a state of the arm unit. The brake control unit is configured to control the brake unit to restrict the actuation of the arm unit in accordance with the state of the arm unit. The following describes a work support device, a work support method, a computer program product, and a work support system in detail with reference to the accompanying drawings.

Figure 1:
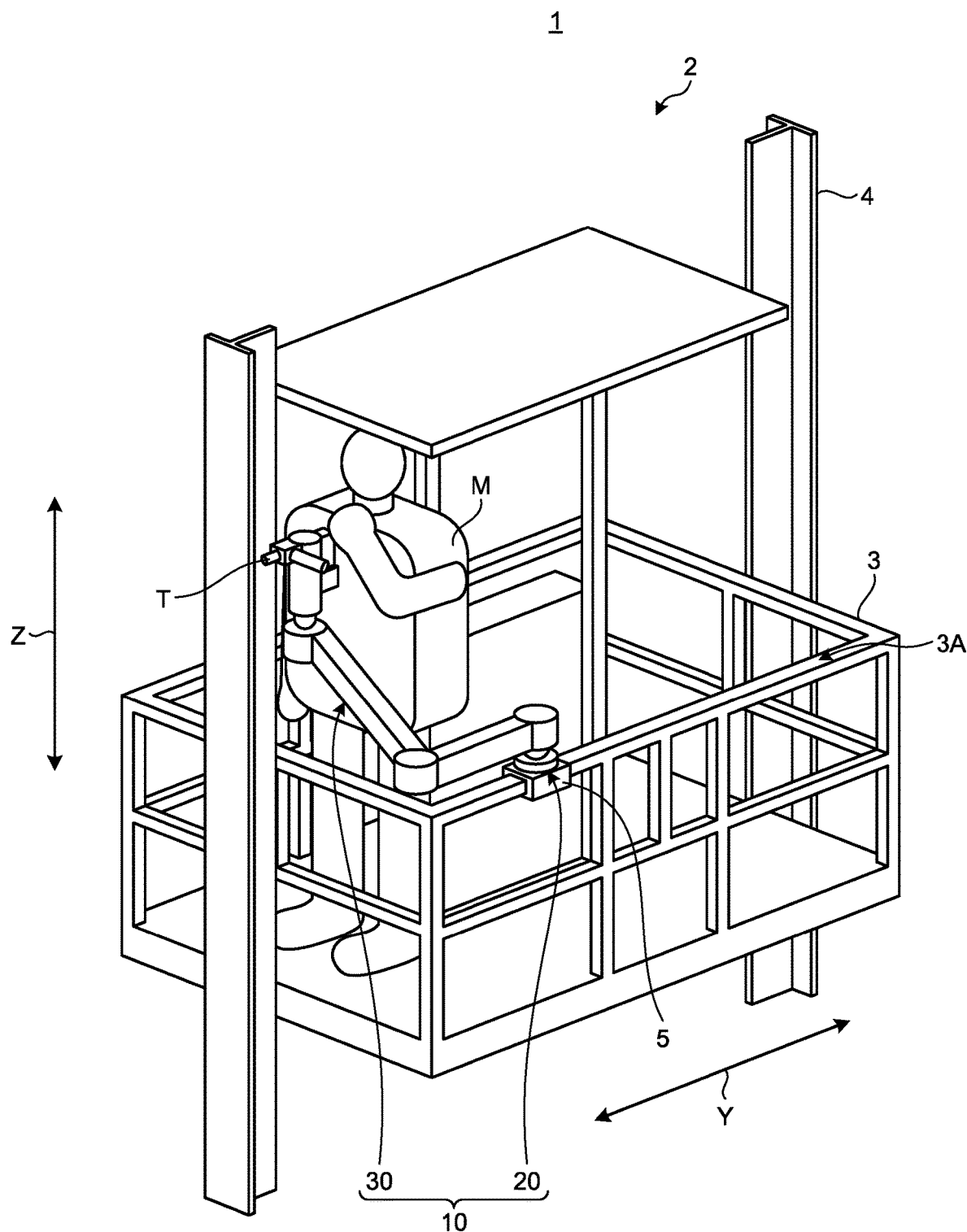
FIG. 1 is a schematic diagram of a work support system according to an embodiment.

FIG. 1 is a schematic diagram illustrating an exemplary work support system 1 of the present embodiment.

The work support system 1 is a system for supporting work by a worker M. The worker M is an exemplary user. For example, the work support system 1 supports work by the worker M in a passage.

The passage has such a size that the worker M can work inside. The passage is, for example, an elevator hoistway 2, a tunnel in which an object such as a vehicle moves, or a sewer. The present embodiment describes an example in which the passage is the elevator hoistway 2. The elevator hoistway 2 is also referred to as an elevator shaft. The work support system 1 may be any system that supports work by the worker M, and its support target work is not limited to work in the passage such as the elevator hoistway 2.

The work support system 1 includes a work support device 10.

In the exemplary form described in the present embodiment, the work support device 10 is disposed in the elevator hoistway 2. In addition, in the exemplary form described in the present embodiment, the work support device 10 is disposed at a scaffold 3.

The scaffold 3 is a cradle capable of accommodating the worker M. For example, the scaffold 3 is a scaffold unit used in assembly of an elevator or the like, an elevator car, or a workbench. The scaffold 3 is detachably installed in the elevator hoistway 2 at maintenance or the like. The scaffold 3 disposed in the elevator hoistway 2 is supported by a displacement member disposed at a top part of the elevator hoistway 2 through a guide rail 4 and a cable. The scaffold 3 can be moved in a height direction Z along the guide rail 4 in the elevator hoistway 2 by the displacement member.

The work support device 10 installed at the scaffold 3 is movable in the height direction Z in the elevator hoistway 2. Alternatively, the work support device 10 may be fixed in the elevator hoistway 2 or may be detachably installed at the scaffold 3 disposed in the elevator hoistway 2. The following description of the present embodiment assumes a case in which the worker M on the scaffold 3 disposed in the elevator hoistway 2 works in the elevator hoistway 2.

The work support device 10 includes a control unit 20 and an arm unit 30.

The control unit 20 controls actuation of the arm unit 30. The arm unit 30 is an assist mechanism for holding an object T. In other words, the arm unit 30 is a mechanism for supporting handling of the object T by the worker M.

The object T is a target that the worker M contacts or holds at work. Examples of the object T include various equipment and tools such as an electric drill and an impact driver, and various attachment members and fixation members such as a bracket, a guide rail, a counter weight, and a component.

In the present embodiment, the arm unit 30 is supported at the scaffold 3 by a support unit 5. The support unit 5 is provided to an outer frame member 3A of the scaffold 3 and movably supports the arm unit 30 along the outer frame member 3A. For example, the support unit 5 movably supports the arm unit 30 in an extension direction (the direction of arrow Y) of the outer frame member 3A. The support unit 5 is, for example, a linear movement slider. Accordingly, the arm unit 30 has a compact configuration and has a movable range in which work by the worker M can be assisted without interference with a work area of the worker M.

Figure 2:
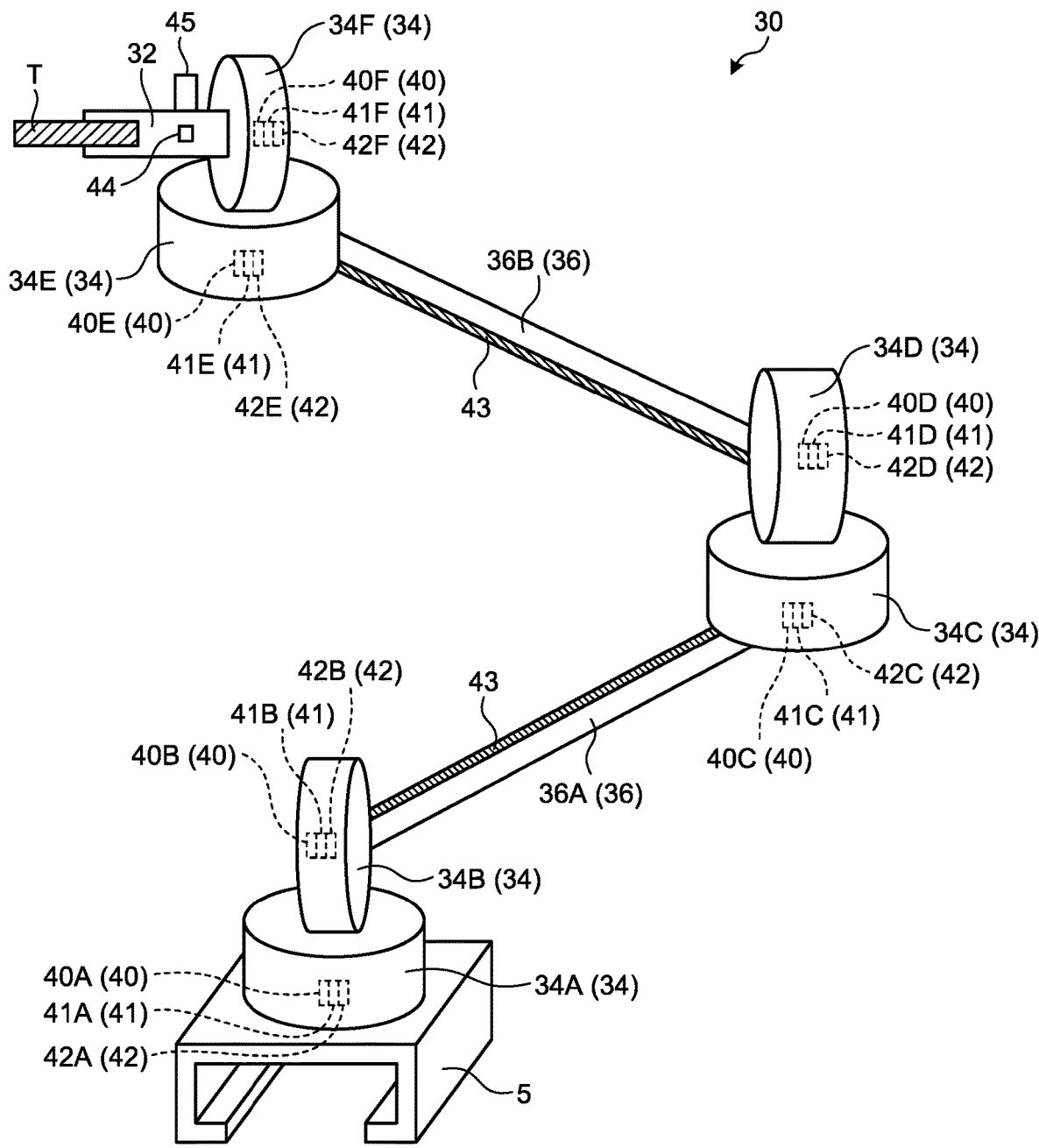
FIG. 2 is a schematic diagram of an arm unit according to the embodiment.

FIG. 2 is a schematic diagram of an example of the arm unit 30.

The arm unit 30 includes a grasping part 32, a plurality of joint parts 34, and a plurality of link parts 36.

The grasping part 32 is a mechanism that grasps the object T. The grasping part 32 includes a mechanism such as a pinching mechanism or an electromagnetic chuck to grasp the object T.

Each link part 36 is a bar member. In the present embodiment, the arm unit 30 includes, as the link parts 36, a link part 36A and a link part 36B. The link parts 36 are actuatably coupled through the joint parts 34.

"Actuation" means at least one of linear movement, rotation, and pivot movement. "Actuatable" means that at least one of linear movement, rotation, and pivot movement is possible. In an exemplary form described in the present embodiment, "actuation" means rotation, and "actuatable" means rotatable.

The joint parts 34 are a coupling mechanism for coupling a pair of the link part 36A and the link part 36B and a pair of the link part 36B and the grasping part 32 in an actuatable manner. In the present embodiment, the arm unit 30 includes joint parts 34A to 34F as the joint parts 34.

The joint part 34A and the joint part 34B couple the link part 36A on the support unit 5 in an actuatable manner. In the present embodiment, the joint part 34A is a horizontal rotation joint that is horizontally rotatable. The rotational axis of the joint part 34B orthogonally crosses the rotational axis of the joint part 34A. The joint part 34B is a vertical rotation joint that is vertically rotatable.

The joint part 34C and the joint part 34D couple the link part 36A and the link part 36B with each other in an actuatable manner. In the present embodiment, the joint part 34C is a horizontal rotation joint. The rotational axis of the joint part 34D orthogonally crosses the rotational axis of the joint part 34C. The joint part 34D is a vertical rotation joint. The link part 36A has a parallel-link structure. With this configuration, the joint part 34C is horizontally rotatable irrespective of the rotation angles of the joint part 34A and the joint part 34B.

The joint part 34E and the joint part 34F couple the link part 36B and the grasping part 32 with each other in an actuatable manner. In other words, the link part 36B and the grasping part 32 are coupled with each other through the joint part 34E and the joint part 34F. In the present embodiment, the joint part 34E is a horizontal rotation joint. The rotational axis of the joint part 34F orthogonally crosses the rotational axis of the joint part 34E. The joint part 34F is a vertical rotation joint. The link part 36B has a parallel-link structure. With this configuration, the joint part 34E is horizontally rotatable irrespective of the rotation angles of the joint part 34C and the joint part 34D.

As described above, the arm unit 30 includes the joint parts 34. Thus, it is advantageous that the worker M can easily intuitively understand motion of the arm unit 30 and safely perform work.

In addition, as described above, at least one of the joint parts 34 is a horizontal rotation joint, and at least another one of the joint parts 34 is a vertical rotation joint. Specifically, in the present embodiment, the joint part 34A, the joint part 34C, and the joint part 34E are horizontal rotation joints. The link part 36A and the link part 36B each have a parallel-link structure.

With this configuration, the posture of each of the joint part 34A, the joint part 34C, and the joint part 34C is constantly horizontally maintained. Thus, the arm unit 30 of the present embodiment does not need to support gravitational force through actuation of these horizontal rotation joints. In addition, the arm unit 30 can achieve necessary torque reduction through these horizontal rotation joints when the object T held by the grasping part 32 is a heavy object having a weight equal to or heavier than a threshold value. Moreover, it is possible to reduce the size of the mechanism of the arm unit 30 and the electrical driving power of the arm unit 30.

In the arm unit 30, the rotational axis of at least one of the joint parts 34 only needs to be orthogonal to the rotational axis of at least another one of the joint parts 34, and the rotational axes are not limited to the horizontal and vertical directions.

The grasping part 32 and the link part 36B are coupled with each other through the joint part 34E and the joint part 34F. The joint part 34E is a horizontal rotation joint. The joint part 34F is a vertical rotation joint. The rotational axis of the joint part 34F orthogonally crosses the rotational axis of the joint part 34E.

Figure 3A:
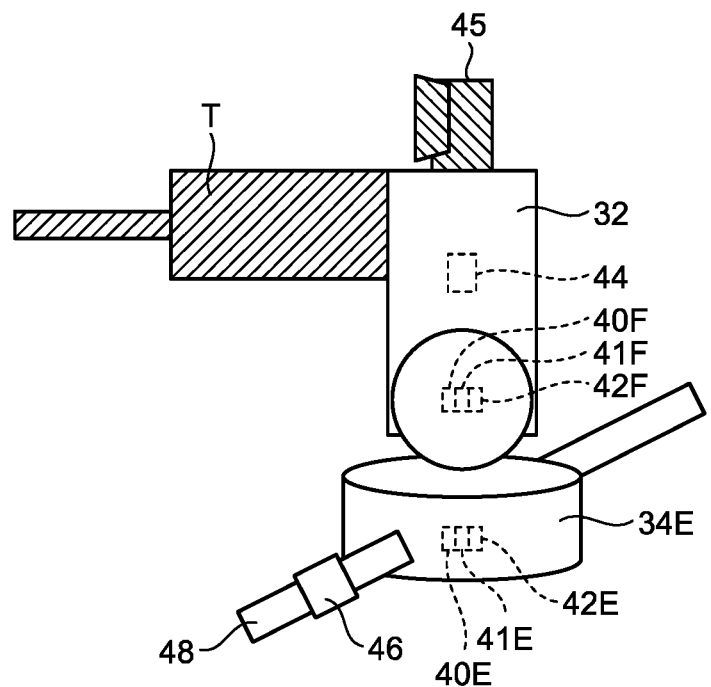
FIG. 3A is an enlarged schematic diagram of a grasping part according to the embodiment.
Figure 3B:
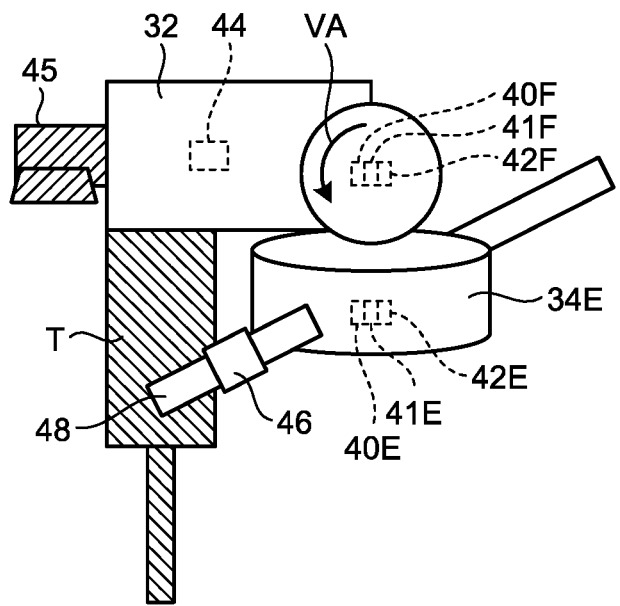
FIG. 3B is an enlarged schematic diagram of the grasping part according to the embodiment.
Figure 3C:
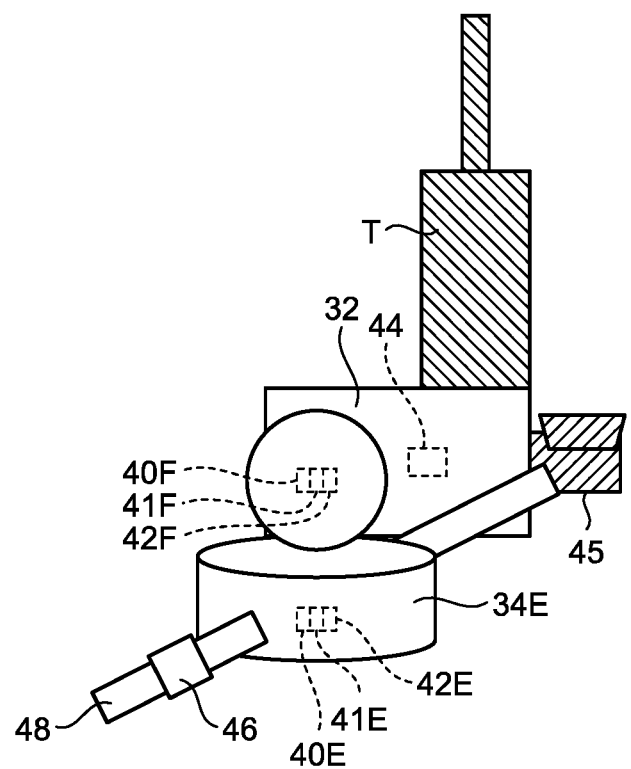
FIG. 3C is an enlarged schematic diagram of the grasping part according to the embodiment.

FIGS. 3A to 3C are enlarged schematic diagrams of the grasping part 32. As described above, the grasping part 32 and the link part 36B are coupled with each other through the joint part 34E and the joint part 34F. Thus, the posture of the object T held by the grasping part 32 is easily changed upward, downward, rightward, and leftward about the axes (refer to FIGS. 3A to 3C). The joint part 34F may be a rotational body that has a spherical shape and is rotatable by 360°.

A handle part 48 to be grasped by the worker M during work is provided to the joint part 34E. The handle part 48 is a handle for the worker M to change the posture of the arm unit 30 or operate the position and posture of the object T grasped by the grasping part 32. The worker M can move the grasping part 32 in a desired direction by operating the handle part 48.

An input unit 46 is provided to the handle part 48. The input unit 46 is an input mechanism for receiving various operation instructions from the worker M. In the present embodiment, the input unit 46 receives, for example, input of a switching instruction to perform switching between an automatic mode and a manual mode. Details of the automatic mode and the manual mode will be described later.

The description continues with reference back to FIG. 2.

Each joint part 34 of the arm unit 30 is provided with a drive unit 40, a brake unit 41, and an angle sensor 42.

Specifically, the joint part 34A to the joint part 34F are provided with drive unit 40A to drive unit 40F, brake unit 41A to brake unit 41F, and angle sensor 42A to angle sensor 42F, respectively. When collectively described, the joint part 34A to the joint part 34F are referred to as the joint parts 34. When collectively described, the drive unit 40A to the drive unit 40F are referred to as the drive units 40. When collectively described, the brake unit 41A to the brake unit 41F are referred to as the brake units 41. When collectively described, the angle sensor 42A to the angle sensor 42F are referred to as the angle sensors 42.

The drive unit 40 actuates the corresponding joint part 34. The drive unit 40 is provided in at least one of the joint parts 34. The drive unit 40 is, for example, an actuator. In the exemplary form described in the present embodiment, the drive unit 40 is provided in each joint part 34 included in the arm unit 30. In the present embodiment, the drive unit 40 rotatably drives the joint part 34 provided with the drive unit 40. The drive unit 40 is driven under control of the control unit 20 to be described later (to be described later in detail). The drive unit 40 may be a well-known mechanism.

The brake unit 41 restricts the actuation of the arm unit 30. The brake unit 41 is provided in at least one of the joint parts 34. In the exemplary form described in the present embodiment, the brake unit 41 is provided in each joint part 34 included in the arm unit 30. The brake unit 41 restricts actuation of the joint part 34 provided with the brake unit 41, thereby restricting actuation of the arm unit 30. "Restriction of actuation" means at least one of deceleration of the speed of actuation of the arm unit 30 and the joint part 34 and stopping of actuation of the arm unit 30 and the joint part 34. In other words, in the present embodiment, the brake unit 41 controls deceleration of the rotational speed of the joint part 34 or stopping of rotation of the joint part 34. The brake unit 41 may be a well-known braking mechanism.

The angle sensor 42 is a sensor that measures a joint angle that is a variable amount (VA) as the rotation angle of the joint part 34. In the present embodiment, the angle sensor 42 is provided in each joint part 34. The angle sensor 42 measures, as the joint angle, the rotation angle of the joint part 34 provided with the angle sensor 42 based on a reference position. The reference position may be set in advance.

The arm unit 30 also includes an obstacle sensing unit 43, a force sensor 44, and a target position detection unit 45.

The obstacle sensing unit 43 senses any obstacle around the arm unit 30. An obstacle is an object that encumbers movement of the arm unit 30. An obstacle is, for example, a user such as the worker M, a wall in the elevator hoistway 2, or a member protruding from a wall.

In the exemplary form described in the present embodiment, the obstacle sensing unit 43 is disposed on the surface of each of the link part 36A and the link part 36B. The obstacle sensing unit 43 may be provided to each joint part 34 and the grasping part 32. The obstacle sensing unit 43 is, for example, a well-known optical sensor but is not limited thereto.

The force sensor 44 is a force sensor that detects pressure applied to the arm unit 30 and the direction of the pressure. In the present embodiment, the force sensor 44 is provided to the grasping part 32. Accordingly, the force sensor 44 detects pressure applied to the grasping part 32 and the direction of the pressure applied to the grasping part 32. In other words, the force sensor 44 detects the strength of force applied for moving the grasping part 32 and the direction of pressurization.

The target position detection unit 45 is an exemplary detector. The target position detection unit 45 detects a target position.

The target position is a target position at which the grasping part 32 or the object T grasped by the grasping part 32 is to be positioned. In the present embodiment, the target position detection unit 45 specifies the relative position of the grasping part 32 with respect to the target position. The target position detection unit 45 is, for example, an image capturing device that obtains captured image data through image capturing. Hereinafter, the captured image data is also simply referred to as a captured image.

The following describes a functional configuration of the work support system 1 of the present embodiment.

Figure 4:
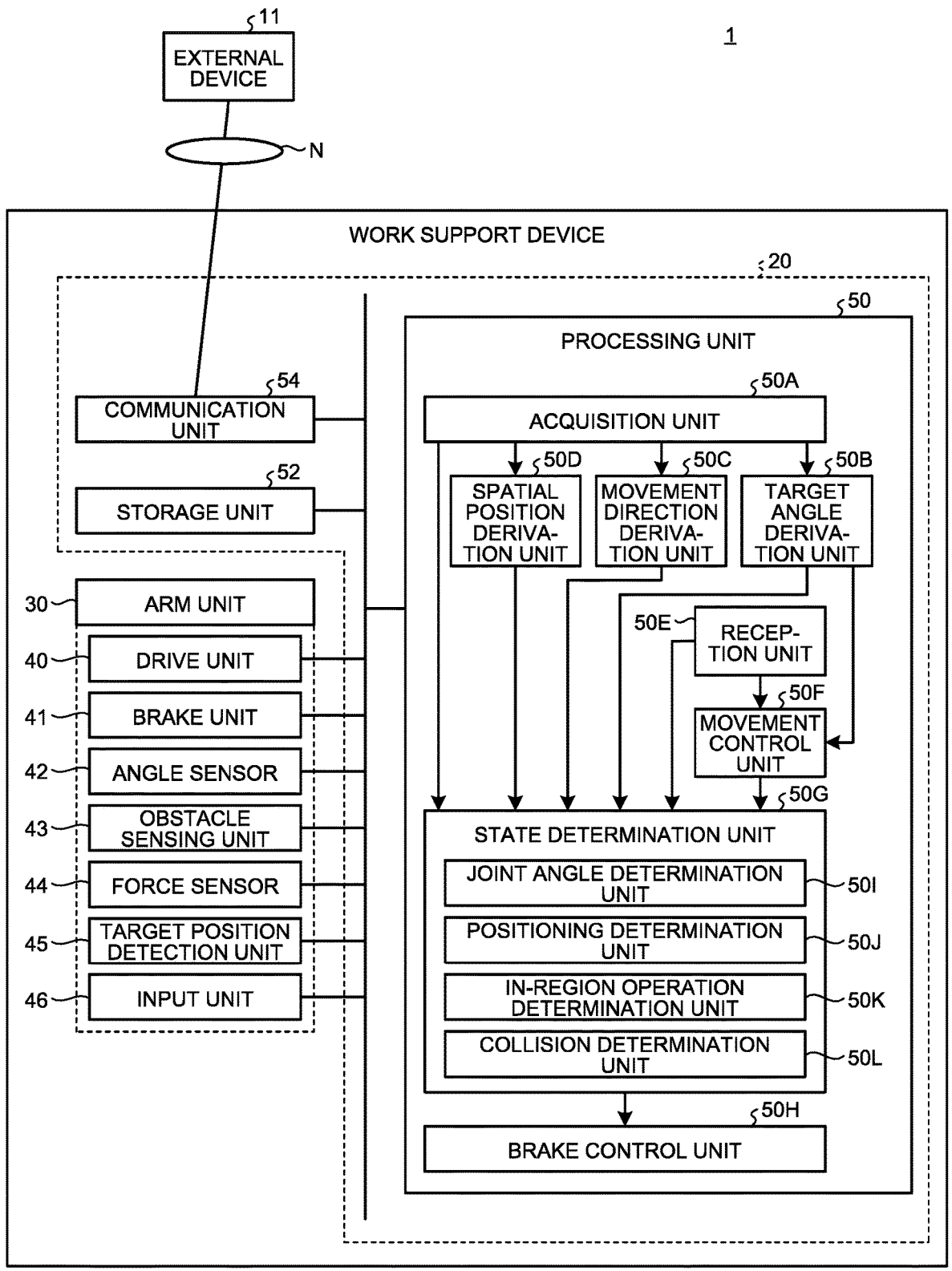
FIG. 4 is a functional block diagram of the work support system according to the embodiment.

FIG. 4 is a functional block diagram illustrating an exemplary functional configuration of the work support system 1 of the present embodiment.

The work support system 1 includes the work support device 10 and an external device 11. The work support device 10 and the external device 11 are communicably connected with each other through a network N or the like.

The external device 11 is a well-known computer such as a server device. For example, the external device 11 is a server device such as a building information modeling (BIM) system that designs a work process or the like in advance.

The work support device 10 includes the control unit 20 and the arm unit 30. The arm unit 30 includes the drive unit 40, the brake unit 41, the angle sensor 42, the obstacle sensing unit 43, the force sensor 44, the target position detection unit 45, and the input unit 46. The control unit 20 is communicably connected with each of the drive unit 40, the brake unit 41, the angle sensor 42, the obstacle sensing unit 43, the force sensor 44, the target position detection unit 45, and the input unit 46.

The control unit 20 is, for example, a dedicated or general-purpose computer. The control unit 20 includes a processing unit 50, a storage unit 52, and a communication unit 54. The processing unit 50 is communicably connected with each of the communication unit 54 and the storage unit 52.

Specifically, the processing unit 50, the storage unit 52, the communication unit 54, the drive unit 40, the brake unit 41, the angle sensor 42, the obstacle sensing unit 43, the force sensor 44, the target position detection unit 45, and the input unit 46 are communicably connected with one another through a bus 56.

The storage unit 52 stores therein various kinds of data. The storage unit 52 is, for example, a semiconductor memory device such as a random-access memory (RAM) or a flash memory, a hard disk, or an optical disc. The storage unit 52 may be a storage device provided outside the work support device 10. Alternatively, the storage unit 52 may be a storage medium. Specifically, the storage medium may store or temporarily store therein computer programs and various kinds of information downloaded through a local area network (LAN), the Internet, or the like. The storage unit 52 may be formed of a plurality of storage media.

At least one of the storage unit 52 and the processing unit 50 may be mounted on the external device 11 such as a server device connected with the network N. In addition, at least one of functional components (to be described later) included in the processing unit 50 may be mounted on the external device 11 such as a server device connected with the processing unit 50 through the network N.

The processing unit 50 includes an acquisition unit 50A, a target angle derivation unit 50B, a movement direction derivation unit 50C, a spatial position derivation unit 50D, a reception unit 50E, a movement control unit 50F, a state determination unit 50G, and a brake control unit 50H. The state determination unit 50G includes a joint angle determination unit 50I, a positioning determination unit 50J, an in-region operation determination unit 50K, and a collision determination unit 50L.

At least one of the acquisition unit 50A, the target angle derivation unit 50B, the movement direction derivation unit 50C, the spatial position derivation unit 50D, the reception unit 50E, the movement control unit 50F, the state determination unit 50G, the brake control unit 50H, the joint angle determination unit 50I, the positioning determination unit 50J, the in-region operation determination unit 50K, and the collision determination unit 50L is implemented by, for example, one or a plurality of processors. For example, each of the above-described components may be implemented through execution of a computer program by a processor such as a central processing unit (CPU), in other words, by software. Each of the above-described components may be implemented by a processor such as a dedicated integrated circuit (IC), in other words, by hardware. Each of the above-described components may be implemented by software and hardware in combination. When a plurality of processors are used, each processor may implement one of the components or may implement two or more of the components.

The acquisition unit 50A acquires the joint angle of each joint part 34 from the corresponding angle sensor 42. The acquisition unit 50A also acquires an obstacle sensing result from the obstacle sensing unit 43. The acquisition unit 50A also acquires a result of detection of pressure applied to the grasping part 32 and the direction of the pressure from the force sensor 44. The acquisition unit 50A also acquires a result of detection of the target position from the target position detection unit 45.

The acquisition unit 50A also acquires the target position. The acquisition unit 50A acquires the target position from the external device 11. The target position is set in advance based on, for example, an operation instruction through the input unit 46 by the user and stored in the storage unit 52. The acquisition unit 50A acquires the target position by reading the target position from the communication unit 54. The external device 11 may specify the target position for each work content or each work process. In this case, the acquisition unit 50A can acquire the target position from the external device 11 through the communication unit 54.

The target angle derivation unit 50B derives a target angle that is the joint angle of each joint part 34 when the grasping part 32 is positioned at the target position.

The target angle derivation unit 50B acquires the target position acquired by the acquisition unit 50A and information of the current position of the support unit 5 supporting the joint part 34A of the arm unit 30. The information of the current position of the support unit 5 is information indicating the spatial position of the support unit 5. The information of the current position of the support unit 5 is stored in, for example, the storage unit 52. Then, the target angle derivation unit 50B derives the posture of the arm unit 30 when the grasping part 32 of the arm unit 30 is positioned at the target position by using a well-known method or the like. Then, the target angle derivation unit 50B derives, as the target angle, the joint angle of each joint part 34 of the arm unit 30 in the derived posture. In other words, the target angle derivation unit 50B derives the target angle for each joint part 34 provided to the arm unit 30. Then, the target angle derivation unit 50B stores the derived target angle in the storage unit 52 in association with identification information of the corresponding joint part 34.

The movement direction derivation unit 50C derives the movement direction of the arm unit 30. Specifically, the movement direction derivation unit 50C derives the movement direction of each of the grasping part 32, the link part 36B, and the joint parts 34 as components included in the arm unit 30 by using the result of detection of pressure applied to the grasping part 32 and the direction of the pressure, which are acquired from the force sensor 44, and the result of detection of the joint angle of each joint part 34, which is acquired from the corresponding angle sensor 42.

The spatial position derivation unit 50D derives the spatial position of the arm unit 30. The spatial position of the arm unit 30 is information indicating the position and posture of each part included in the arm unit 30. For example, the spatial position of the arm unit 30 is information indicating the position coordinates of each of the grasping part 32, the joint parts 34, and the link parts 36 as parts included in the arm unit 30, in the real space. The spatial position of the arm unit 30 may be information further including the position coordinates of the object T grasped by the grasping part 32.

For example, the spatial position derivation unit 50D derives the spatial position of the arm unit 30 by applying the angle of each joint part 34, which is acquired by the acquisition unit 50A, to a stereoscopic model of the arm unit 30 that is produced in advance. The spatial position derivation unit 50D may use another method to derive the spatial position of the arm unit 30. For example, the arm unit 30 may be provided with a position sensor, and the spatial position derivation unit 50D may derive the spatial position of the arm unit 30 by using a result of detection by the position sensor.

The reception unit 50E acquires, from the input unit 46, mode information indicating the automatic mode or the manual mode.

An acquisition mode is a mode in which the arm unit 30 is manually moved by the worker M. The automatic mode is a mode in which the arm unit 30 is moved to the target position under control of the movement control unit 50F. The user operates the input unit 46 to input a switching instruction to perform switching from the manual mode to the automatic mode or from the automatic mode to the manual mode.

Thus, the input unit 46 may be a switch for inputting switching between these modes. The reception unit 50E acquires the mode information indicating the manual mode by receiving a switching instruction to perform switching to the manual mode through the input unit 46. The reception unit 50E acquires the mode information indicating the automatic mode by receiving a switching instruction to perform switching to the automatic mode through the input unit 46.

The movement control unit 50F moves the grasping part 32 of the arm unit 30 to the target position. Specifically, when having received a switching instruction to perform switching to the automatic mode, the movement control unit 50F starts controlling the drive unit 40 to move the grasping part 32 to the target position. The movement control unit 50F controls the drive unit 40 of each joint part 34 provided to the arm unit 30 so that the joint part 34 has the corresponding target angle derived by the target angle derivation unit 50B. Under the control of the movement control unit 50F, the grasping part 32 of the arm unit 30 starts moving toward the target position.

When having received a switching instruction to perform switching to the manual mode, the movement control unit 50F does not control the drive units 40. In this case, upon operation of the handle part 48 by the worker M, the grasping part 32 starts moving in a direction desired by the worker M, and the arm unit 30 starts moving.

The state determination unit 50G determines the state of the arm unit 30. Hereinafter, the state of the arm unit 30 is referred to as an arm state. In the present embodiment, the state determination unit 50G determines the arm state of the arm unit 30 during manual or automatic movement of the arm unit 30. The brake control unit 50H controls each brake unit 41 in accordance with the arm state to restrict actuation of the arm unit 30.

The following describes the state determination unit 50G and the brake control unit 50H in detail.

The state determination unit 50G includes the joint angle determination unit 50I, the positioning determination unit 50J, the in-region operation determination unit 50K, and the collision determination unit 50L.

The joint angle determination unit 50I determines, as the arm state, whether at least one of the joint parts 34 has reached the target angle derived by the target angle derivation unit 50B. Specifically, the joint angle determination unit 50I determines whether the joint angle acquired from at least one of the angle sensors 42 has reached the target angle of the joint part 34 provided with that angle sensor 42.

The brake control unit 50H restricts actuation of the arm unit 30 by restricting actuation of each joint part 34 determined to have reached the target angle.

FIGS. 5A to 5D are explanatory diagrams of exemplary restriction of actuation of the arm unit 30 in accordance with the joint angles of some joint parts 34. Examples of the state of the arm unit 30 are illustrated in a temporally sequential manner from FIGS. 5A to 5D. For example, assume that the target angle derivation unit 50B has derived a joint angle α as the target angle of the joint part 34A, a joint angle β as the target angle of the joint part 34C, and a joint angle γ as the target angle of the joint part 34E.

Figure 5A:
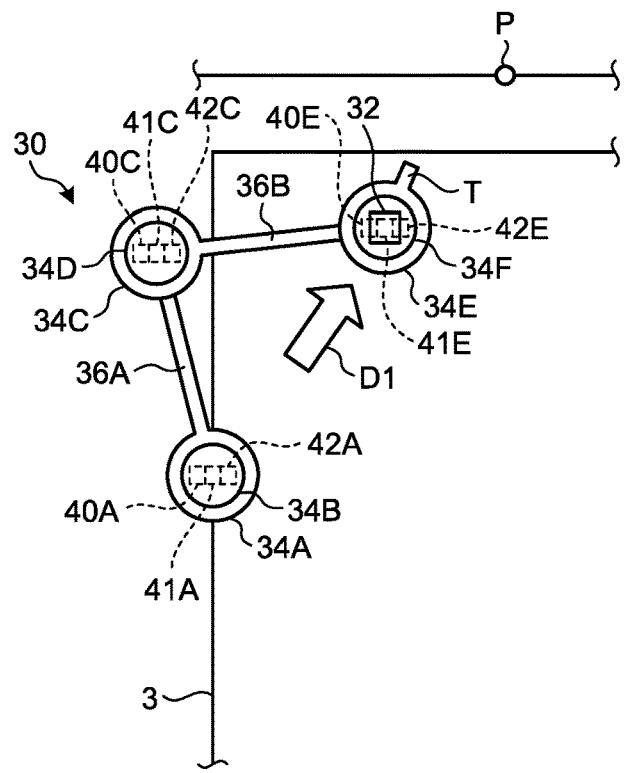
FIG. 5A is an explanatory diagram of actuation restriction of the arm unit in accordance with joint angles of joint parts according to the embodiment.
Figure 5B:
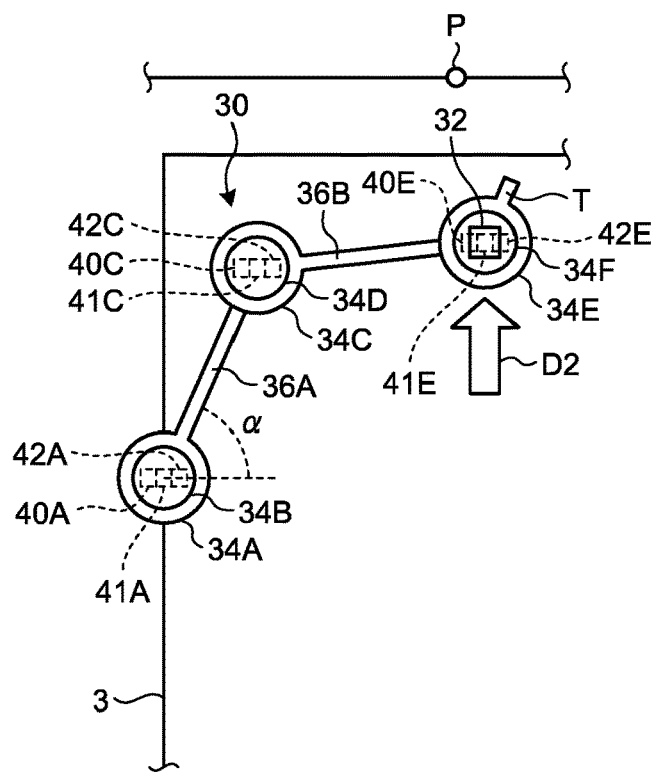
FIG. 5B is an explanatory diagram of actuation restriction of the arm unit in accordance with the joint angles of the joint parts according to the embodiment.

For example, assume that, as illustrated in FIG. 5A, the worker M operates the handle part 48 and applies force in the direction of arrow D1 to the grasping part 32 to move the grasping part 32 toward a target position P. Then, assume that, as illustrated in FIG. 5B, the joint angle of the joint part 34A has become the target joint angle α. In this case, the joint angle determination unit 50I determines that the joint angle of the joint part 34A has reached the target angle. Accordingly, the brake control unit 50H restricts rotation of the joint part 34A by controlling the brake unit 41A of the joint part 34A.

Figure 5C:
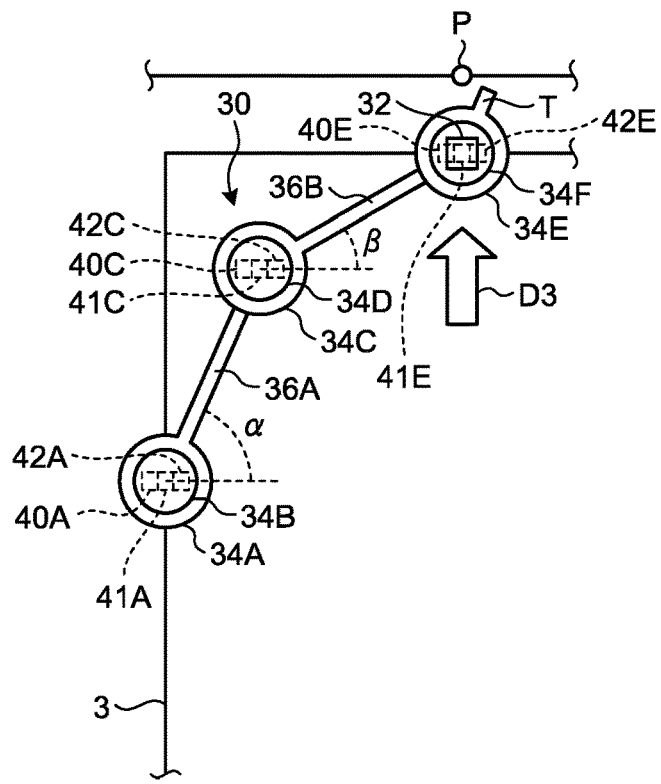
FIG. 5C is an explanatory diagram of actuation restriction of the arm unit in accordance with the joint angles of the joint parts according to the embodiment.

Then, assume that the worker M further operates the handle part 48 and applies force in the direction of arrow D2 to the grasping part 32 to move the grasping part 32 toward the target position P (refer to FIG. 5B). Assume that, through this operation, the joint angle of the joint part 34C has become the target joint angle β as illustrated in FIG. 5C. In this case, the joint angle determination unit 50I determines that the joint angle of the joint part 34C has reached the target angle. Accordingly, the brake control unit 50H restricts rotation of the joint part 34C by controlling the brake unit 41C of the joint part 34C.

Figure 5D:
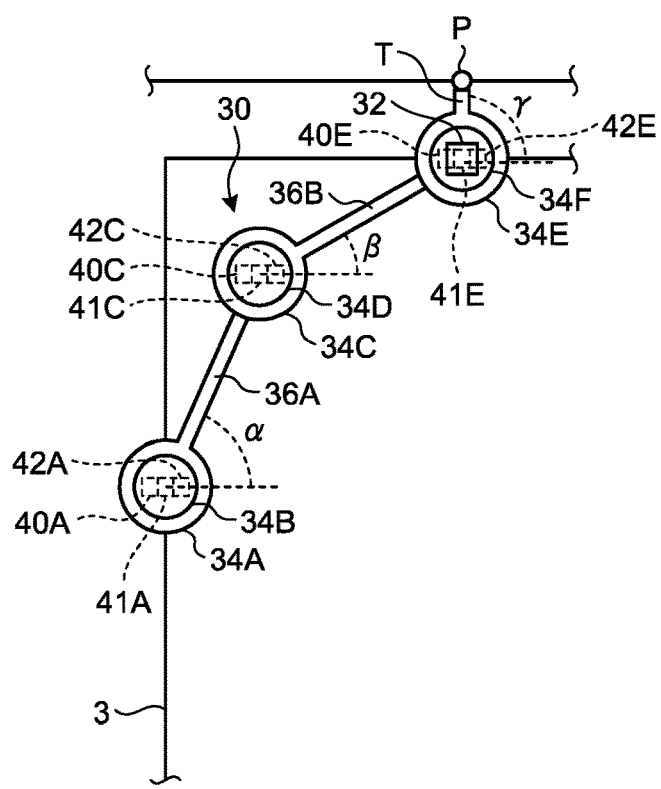
FIG. 5D is an explanatory diagram of actuation restriction of the arm unit in accordance with the joint angles of the joint parts according to the embodiment.

Then, assume that the worker M further operates the handle part 48 and applies force in the direction of arrow D3 to the grasping part 32 to move the grasping part 32 toward the target position P (refer to FIG. 5C). Assume that, through this operation, the joint angle of the joint part 34E has become the target joint angle γ as illustrated in FIG. 5D. In this case, the joint angle determination unit 50I determines that the joint angle of the joint part 34E has reached the target angle. Accordingly, the brake control unit 50H restricts rotation of the joint part 34E by controlling the brake unit 41E of the joint part 34E.

In this manner, in the arm unit 30, rotation of each joint part 34 having reached the corresponding target angle is sequentially restricted. Thus, the object T grasped by the grasping part 32 safely and easily arrives at the target position P.

The joint angle determination unit 50I and the brake control unit 50H execute the same processing in the automatic mode as well in which the arm unit 30 automatically operates as the movement control unit 50F controls the drive unit 40 provided to each joint part 34 of the arm unit 30. Accordingly, the object T safely and easily arrives at the target position P in a case in which the arm unit 30 is driven under control of the movement control unit 50F to move the object T to the target position P, as well.

The description continues with reference back to FIG. 4. Subsequently, the positioning determination unit 50J will be described below.

The positioning determination unit 50J determines, as the arm state, whether the grasping part 32 is positioned at the target position P. In the present embodiment, the positioning determination unit 50J determines whether the grasping part 32 is positioned at the target position P based on a result of detection by the target position detection unit 45.

For example, the positioning determination unit 50J acquires a result of detection of the target position P by the target position detection unit 45 from the acquisition unit 50A. As described above, the target position detection unit 45 is, for example, an image capturing device. In this case, the positioning determination unit 50J specifies the target position P and the relative position of the grasping part 32 with respect to the target position P by performing image analysis of a captured image obtained through image capturing by the target position detection unit 45. The relative position detection may be performed on the target position detection unit 45 side. Then, the positioning determination unit 50J may determine, as the arm state, whether the relative position of the grasping part 32 with respect to the target position P coincides with the target position P.

When it is determined by the positioning determination unit 50J that the grasping part 32 is positioned at the target position P, the brake control unit 50H may control each brake unit 41 to restrict actuation of the arm unit 30. Specifically, in the present embodiment, the brake control unit 50H may restrict rotation of the brake unit 41 of each joint part 34 provided to the arm unit 30.

The accuracy of positioning the grasping part 32 and the object T grasped by the grasping part 32 to the target position P can be improved by controlling the brake control unit 50H in accordance with a result of the determination by the positioning determination unit 50J.

The positioning determination unit 50J and the brake control unit 50H execute the same processing in the automatic mode as well in which the arm unit 30 automatically operates as the movement control unit 50F controls the drive unit 40 provided to each joint part 34 of the arm unit 30. Accordingly, the object T is accurately positioned to the target position P in a case in which the arm unit 30 is driven under control of the movement control unit 50F to move the object T to the target position P, as well.

Subsequently, the in-region operation determination unit 50K and the collision determination unit 50L will be described below.

The in-region operation determination unit 50K determines, as the arm state, whether at least a partial region of the arm unit 30 is likely to protrude from the inside of a set spatial region to the outside of the set spatial region.

The set spatial region is set in advance as a region in which the arm unit 30 can be safely actuated.

Figure 6:
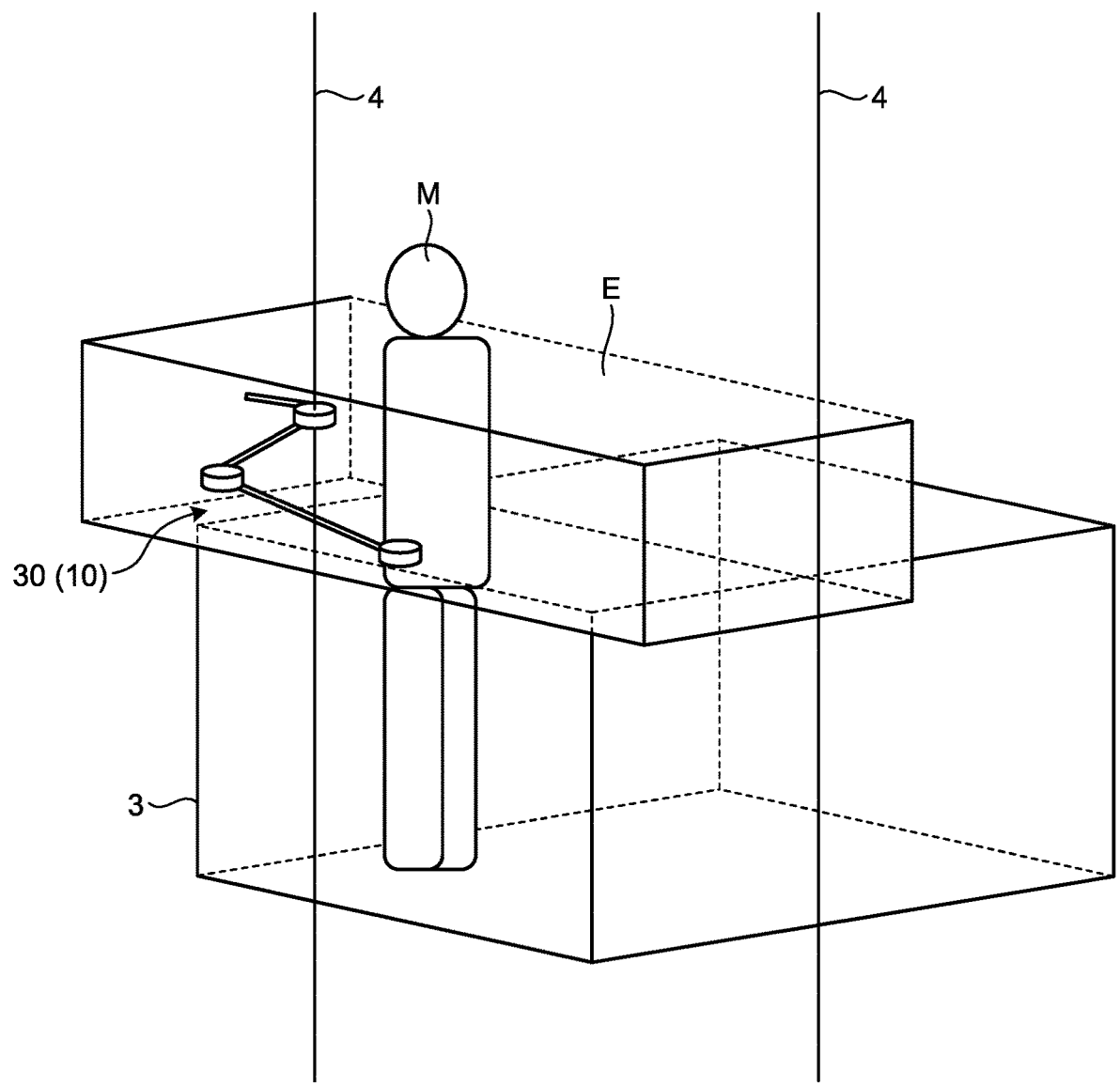
FIG. 6 is an explanatory diagram of a set spatial region according to the embodiment.

FIG. 6 is an explanatory diagram of an exemplary set spatial region E. For example, the set spatial region E is a region in which the arm unit 30 can be safely actuated when the arm unit 30 is actuated by the worker M working with the arm unit 30. Specifically, the set spatial region E includes at least a part of the above-described movable range of the arm unit 30. Set-spatial-region information of the set spatial region E may be stored in the storage unit 52 in advance. The set-spatial-region information may be changeable as appropriate based on an operation instruction through the input unit 46 by the worker M, information received from the external device 11, or the like.

In the present embodiment, the in-region operation determination unit 50K determines whether the arm unit 30 is likely to protrude to the outside of the set spatial region E based on the spatial position of the arm unit 30, the movement direction of the arm unit 30, and the set spatial region E of the set-spatial-region information.

For example, the in-region operation determination unit 50K acquires the spatial position of the arm unit 30, which is derived by the spatial position derivation unit 50D. For example, the in-region operation determination unit 50K acquires the movement direction of the arm unit 30, which is derived by the movement direction derivation unit 50C. For example, the in-region operation determination unit 50K acquires the set-spatial-region information of the set spatial region E from the storage unit 52.

Then, the in-region operation determination unit 50K predicts, by simulation, whether at least a partial region of the parts (the grasping part 32, the joint parts 34, and the link parts 36) included in the arm unit 30, which are indicated by the acquired spatial position of the arm unit 30, is positioned outside the set spatial region E when movement of the arm unit 30 in the movement direction is continued. Then, when a result of the prediction indicates that the region is positioned outside the set spatial region E, the in-region operation determination unit 50K determines that the arm unit 30 is likely to protrude to the outside of the set spatial region E.

When a result of the prediction indicates that the region is positioned inside the set spatial region E, the in-region operation determination unit 50K determines that the arm unit 30 is not likely to protrude to the outside of the set spatial region E.

The current position of at least a partial region of the parts (the grasping part 32, the joint parts 34, and the link parts 36) included in the arm unit 30 in the real space, which are indicated by the acquired spatial position of the arm unit 30, is positioned outside the set spatial region E in some cases. In such a case, the in-region operation determination unit 50K may further determine that the arm unit 30 is likely to protrude to the outside of the set spatial region E.

When it is determined that the arm unit 30 is likely to protrude to the outside of the set spatial region E, the brake control unit 50H controls the brake unit 41 to restrict actuation of the arm unit 30.

Specifically, the brake control unit 50H specifies a joint part 34 that contributes to positional movement of a region of each part included in the arm unit 30, which is determined to be likely to protrude to the outside of the set spatial region E by the in-region operation determination unit 50K. Then, the brake control unit 50H controls the corresponding brake unit 41 to restrict rotation of the specified joint part 34.

Figure 7A:
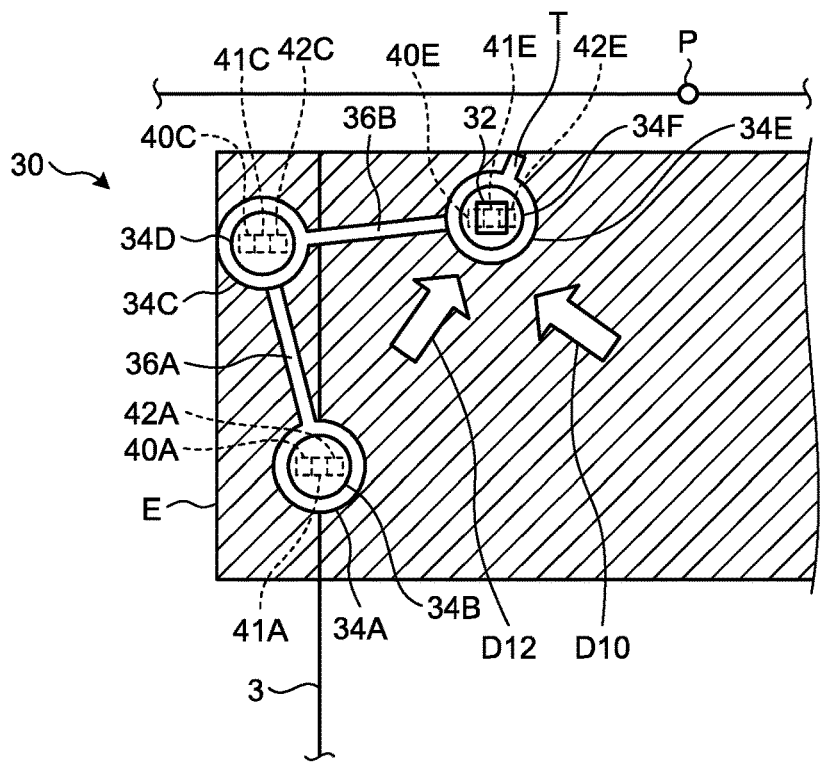
FIG. 7A is an explanatory diagram of actuation restriction of the set spatial region according to the embodiment.
Figure 7B:
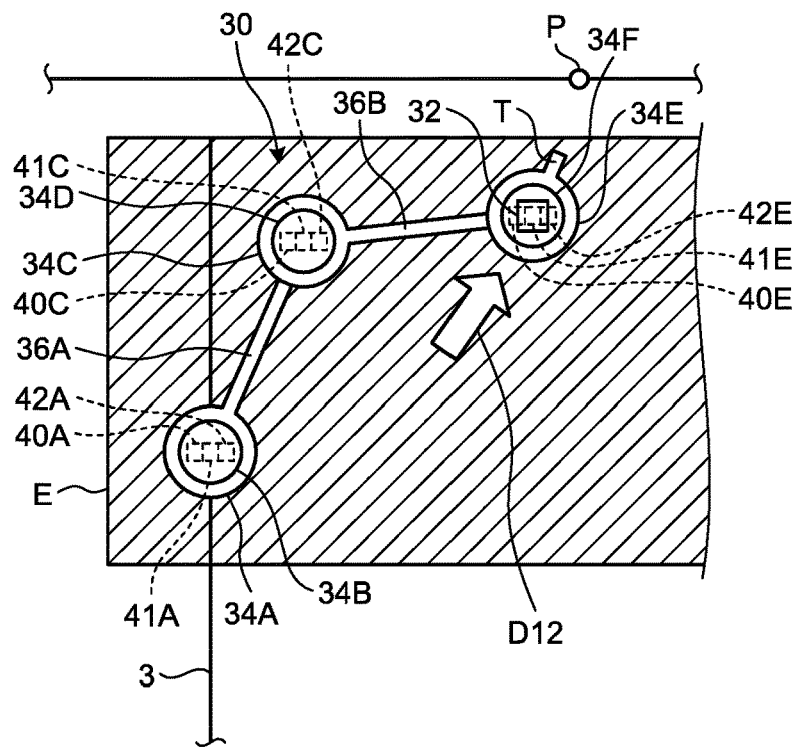
FIG. 7B is an explanatory diagram of actuation restriction of the set spatial region according to the embodiment.

FIGS. 7A and 7B are explanatory diagrams of exemplary actuation restriction in the set spatial region E. Examples of the state of the arm unit 30 are illustrated in a temporally sequential manner from FIGS. 7A to 7B.

For example, assume that, as illustrated in FIG. 7A, the worker M operates the handle part 48 and applies force in the direction of arrow D10 to the grasping part 32 to move the grasping part 32 toward the target position P.

In this case, the joint part 34C and the joint part 34D are likely to be positioned outside the set spatial region E when movement of the arm unit 30 in the direction of the arrow D10 is continued as force in the direction of the arrow D10 is continuously applied. In this case, the in-region operation determination unit 50K determines that the joint part 34C and the joint part 34D of the arm unit 30 are likely to protrude to the outside of the set spatial region E based on the spatial position of the arm unit 30, which is derived by the spatial position derivation unit 50D, the movement direction of the arm unit 30, which is derived by the movement direction derivation unit 50C, and the set spatial region E of the set-spatial-region information.

Thus, in this case, the brake control unit 50H specifies a joint part 34 that contributes to positional movement of the joint part 34C and the joint part 34D determined to be likely to protrude to the outside of the set spatial region E by the in-region operation determination unit 50K. For example, assume that the brake control unit 50H specifies the joint part 34A, the joint part 34C, and the joint part 34E. In this case, the brake control unit 50H controls the brake unit 41A, the brake unit 41C, and the brake unit 41E to restrict rotation of the specified joint parts 34A, 34C, and 34E.

Accordingly, movement of the arm unit 30 due to application of force in the direction of the arrow D10 is restricted. Specifically, the brake control unit 50H controls the brake unit 41 based on a result of determination by the in-region operation determination unit 50K, thereby preventing at least a partial region of the arm unit 30 from protruding to the outside of the set spatial region E.

Then, assume that the worker M further operates the handle part 48 and applies force in the direction of arrow D12, which is different from the direction of the arrow D10, to the grasping part 32 to move the grasping part 32 toward the target position P.

In this case, similarly to the above description, the in-region operation determination unit 50K determines whether at least a partial region of the arm unit 30 is likely to protrude to the outside of the set spatial region E as movement in the direction of the arrow D12 is continued. In this example, assume a case in which it is determined that the set spatial region E is not likely to protrude to the outside of the set spatial region E. In this case, the brake control unit 50H cancels rotation restriction on the joint part 34 rotation of which is restricted. Accordingly, as illustrated in FIG. 7B, the worker M can move the grasping part 32 in a direction toward the object T by continuously applying force in the direction of the arrow D12 to the grasping part 32.

The in-region operation determination unit 50K and the brake control unit 50H execute the same processing in the automatic mode as well in which the arm unit 30 automatically operates as the movement control unit 50F controls the drive unit 40 provided to each joint part 34 of the arm unit 30. Accordingly, the object T safely and easily arrives at the target position P in a case in which the arm unit 30 is driven under control of the movement control unit 50F to move the object T to the target position P, as well.

The description continues with reference back to FIG. 4. Subsequently, the collision determination unit 50L will be described below.

The collision determination unit 50L determines, as the arm state, whether at least a partial region of the arm unit 30 is in a close state in which the partial region of the arm unit 30 is close to an obstacle, based on a result of sensing by the obstacle sensing unit 43. The close state means a state in which the distance between at least a partial region of the arm unit 30 and the obstacle is equal to or shorter than a predetermined threshold value. The close state may also mean that a state in which the distance between the arm unit 30 and the obstacle is likely to become equal to or shorter than the threshold value as the arm unit 30 continuously moves. In the example described in the present embodiment, the close state means that the distance between the arm unit 30 and the obstacle is likely to become equal to or shorter than the threshold value as the arm unit 30 continuously moves. The threshold value may be set in advance to be a value that can avoid a state in which the arm unit 30 and the arm unit 30 become close to each other enough to compromise safety and the close state is caused by changing the movement direction of the arm unit 30.

In the present embodiment, the collision determination unit 50L determines whether at least a partial region of the arm unit 30 is in the close state based on a result of sensing by the obstacle sensing unit 43, and the movement direction of the arm unit 30, which is derived from a result of sensing by the force sensor 44.

Figure 8:
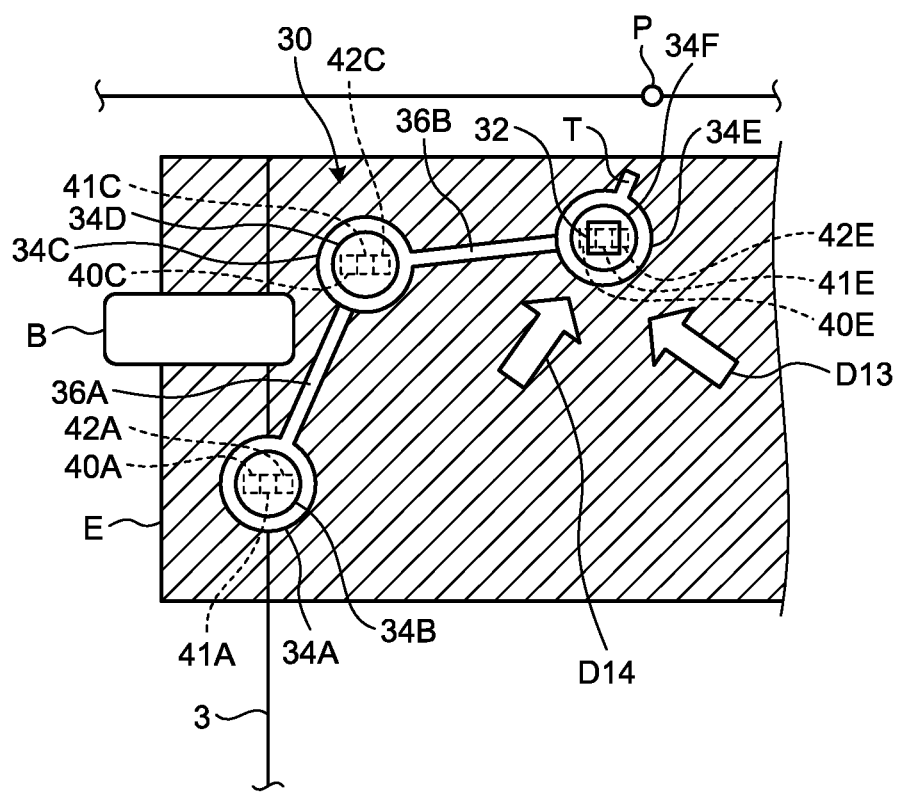
FIG. 8 is an explanatory diagram of actuation restriction of the arm unit in a close state according to the embodiment.

FIG. 8 is an explanatory diagram of exemplary restriction of actuation of the arm unit 30 in the close state.

For example, assume that, as illustrated in FIG. 8, the worker M operates the handle part 48 and applies force in the direction of arrow D13 to the grasping part 32 to move the grasping part 32 toward the target position P.

In this case, the distance between the link part 36A and an obstacle B is likely to become equal to or shorter than the above-described threshold value as movement of the arm unit 30 in the direction of the arrow D13 is continued through continuous application of force in the direction of the arrow D13. Thus, in this case, the in-region operation determination unit 50K determines that at least a partial region of the arm unit 30 is in the close state based on the movement direction of the arm unit 30, which is derived from a result of sensing by the force sensor 44, and a result of sensing by the obstacle sensing unit 43.

When it is determined that at least a partial region of the arm unit 30 is in the close state, the brake control unit 50H controls the brake unit 41 to restrict actuation of the arm unit 30.

The brake control unit 50H specifies a joint part 34 that contributes to positional movement of a part of the arm unit 30, which is determined to be in the close state by the collision determination unit 50L. For example, assume that the brake control unit 50H specifies the joint part 34A and the joint part 34C. In this case, the brake control unit 50H controls the brake unit 41A and the brake unit 41C to restrict rotation of the specified joint parts 34A and 34C.

Accordingly, movement of the arm unit 30 due to application of force in the direction of the arrow D13 is restricted. Specifically, the brake control unit 50H controls the brake unit 41 based on a result of determination by the collision determination unit 50L, thereby preventing at least a partial region of the arm unit 30 from colliding with the obstacle B.

Then, assume that the worker M further operates the handle part 48 and applies force in the direction of arrow D14, which is different from the direction of arrow D13, to the grasping part 32 to move the grasping part 32 toward the target position P.

In this case, similarly to the above description, the collision determination unit 50L determines whether the arm unit 30 becomes close to the obstacle B as movement in the direction of the arrow D14 is continued. In this example, assume a case in which it is determined that the arm unit 30 does not become close to the obstacle B. In this case, the brake control unit 50H cancels rotation restriction on the joint part 34 rotation of which is restricted. Accordingly, the worker M can move the grasping part 32 in a direction toward the object T while avoiding the obstacle B by continuously applying force in the direction of the arrow D14 to the grasping part 32.

The collision determination unit 50L and the brake control unit 50H execute the same processing in the automatic mode as well in which the arm unit 30 automatically operates as the movement control unit 50F controls the drive unit 40 provided to each joint part 34 of the arm unit 30. Accordingly, the object T safely and easily arrives at the target position P in a case in which the arm unit 30 is driven under control of the movement control unit 50F to move the object T to the target position P, as well.

Subsequently, the process of basic work support processing executed by the work support device 10 of the present embodiment will be described below.

Figure 9:
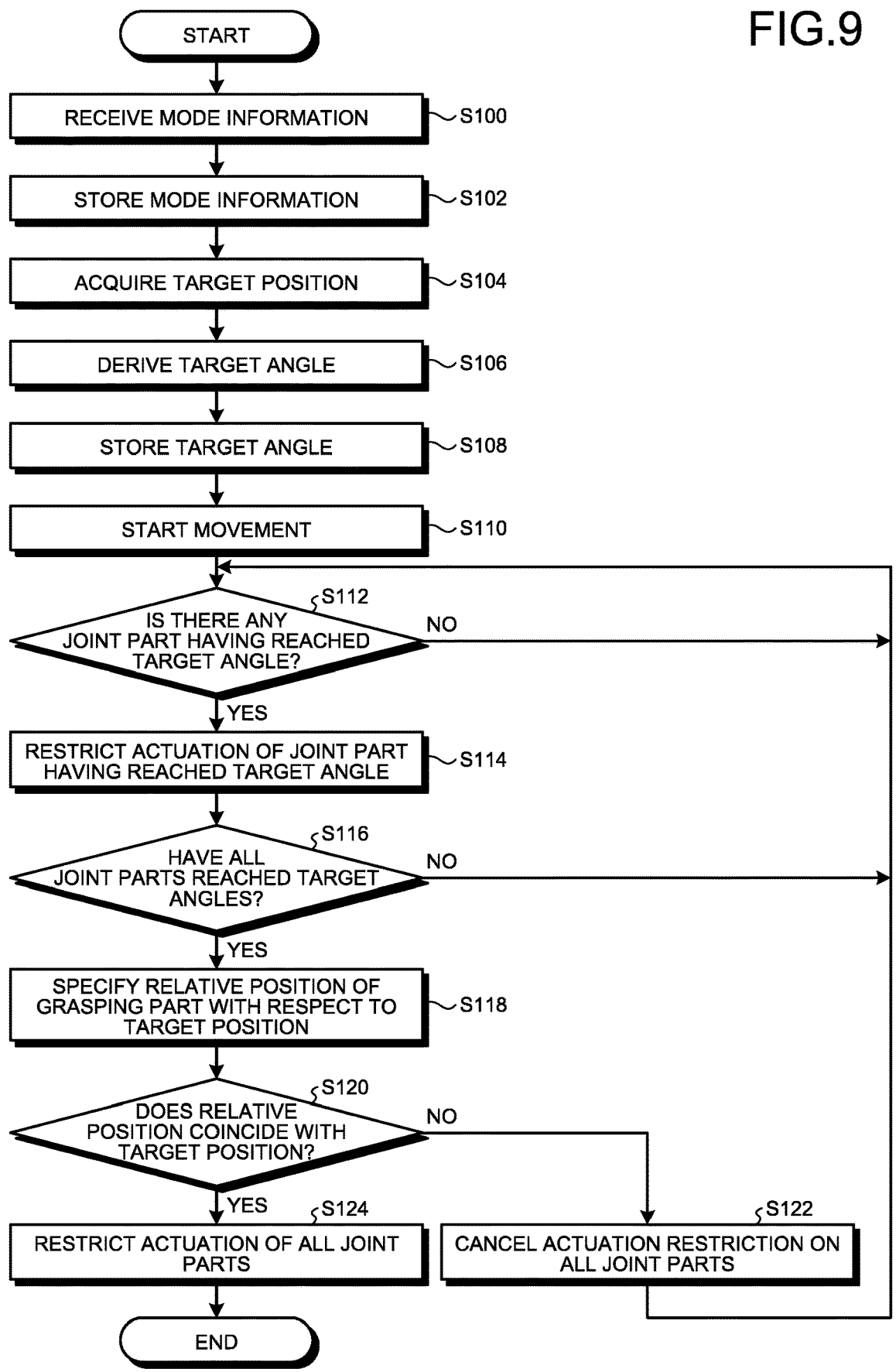
FIG. 9 is a flowchart illustrating the flow of work support processing according to the embodiment.

FIG. 9 is a flowchart illustrating an exemplary flow of the work support processing executed by the work support device 10.

The reception unit 50E receives mode information indicating the automatic mode or the manual mode from the input unit 46 (step S100). The reception unit 50E stores the acquired mode information in the storage unit 52 (step S102).

The acquisition unit 50A acquires a target position P from the storage unit 52 (step S104). The target angle derivation unit 50B derives, by using the target position P acquired at step S104, a target angle that is the joint angle of each joint part 34 when the grasping part 32 is positioned at the target position P (step S106). The target angle derivation unit 50B stores the target angle derived at step S106 in the storage unit 52 in association with identification information of the corresponding joint part 34 (step S108).

Subsequently, movement of the arm unit 30 is started (step S110). When the mode information stored at step S102 is information indicating the manual mode, movement of the arm unit 30 is disclosed as movement of the grasping part 32 toward the target position P is started through operation of the handle part 48 by the worker M. When the mode information stored at step S102 is information indicating the automatic mode, movement of the arm unit 30 is disclosed so that the grasping part 32 approaches the target position P as the drive unit 40 is controlled by the movement control unit 50F. The state determination unit 50G may determine that movement of the arm unit 30 is started and may execute processing to be described later when a result of detection of the joint angle of the joint part 34, which is acquired from the corresponding angle sensor 42 by the acquisition unit 50A, is a detection result indicating temporal change of the joint angle.

The joint angle determination unit 50I determines whether at least one of the joint parts 34 has reached the target angle derived at step S106 (step S112). At step S112, the negative determination (No at step S112) is repeated until the positive determination is obtained (Yes at step S112). When the positive determination is obtained at step S112 (Yes at step S112), the process proceeds to step S114.

At step S114, the brake control unit 50H restricts actuation of the joint part 34 determined to have reached the target angle at step S112 (step S114).

Subsequently, the joint angle determination unit 50I determines whether all joint parts 34 provided to the arm unit 30 each have reached the corresponding target angle derived at step S106 (step S116). When the negative determination is obtained at step S116 (No at step S116), the process returns to the above-described step S112. When the positive determination is obtained at step S116 (Yes at step S116), the process proceeds to step S118.

At step S118, the positioning determination unit 50J specifies the target position P and the relative position of the grasping part 32 with respect to the target position P by performing image analysis of a captured image obtained through image capturing by the target position detection unit 45 (step S118). Then, the positioning determination unit 50J determines whether the relative position of the grasping part 32 with respect to the target position P coincides with the target position P by using a result of the specification at step S118 (step S120).

When the negative determination is obtained at step S120 (No at step S120), the process proceeds to step S122. At step S122, the brake control unit 50H cancels actuation restriction on all joint parts 34 provided to the arm unit 30 (step S122). Then, the process returns to the above-described step S112.

When the positive determination is obtained at step S120 (Yes at step S120), the process proceeds to step S124. At step S124, the brake control unit 50H restricts actuation of the brake unit 41 of each joint part 34 provided to the arm unit 30 (step S124). Then, the present routine is ended.

The brake control unit 50H may cancel actuation restriction on all joint parts 34 provided to the arm unit 30 after work by the worker M at the target position P is ended. In this case, the brake control unit 50H may execute the following processing.

For example, assume that a work direction at the target position P is set in advance. In addition, assume that the object T grasped by the grasping part 32 is an electric drill. In this case, the work direction is, for example, a direction in which a hole is formed in a wall by the electric drill.

When having determined that pressure in the above-described work direction is applied to the grasping part 32 based on a result of detection of pressure applied to the grasping part 32 and the direction of the pressure, which are acquired from the force sensor 44, the brake control unit 50H continues the actuation restriction processing at the above-described step S124. When the pressure applied to the grasping part 32 in the above-described work direction is canceled or pressure in another direction is detected based on the detection result, the brake control unit 50H determines that work by the worker M at the target position P is ended. Then, having determined that the work is ended, the brake control unit 50H may cancel actuation restriction on all joint parts 34 provided to the arm unit 30.

Subsequently, interrupt processing executed by the work support device 10 during the work support processing illustrated in FIG. 9 will be described below.

Figure 10:
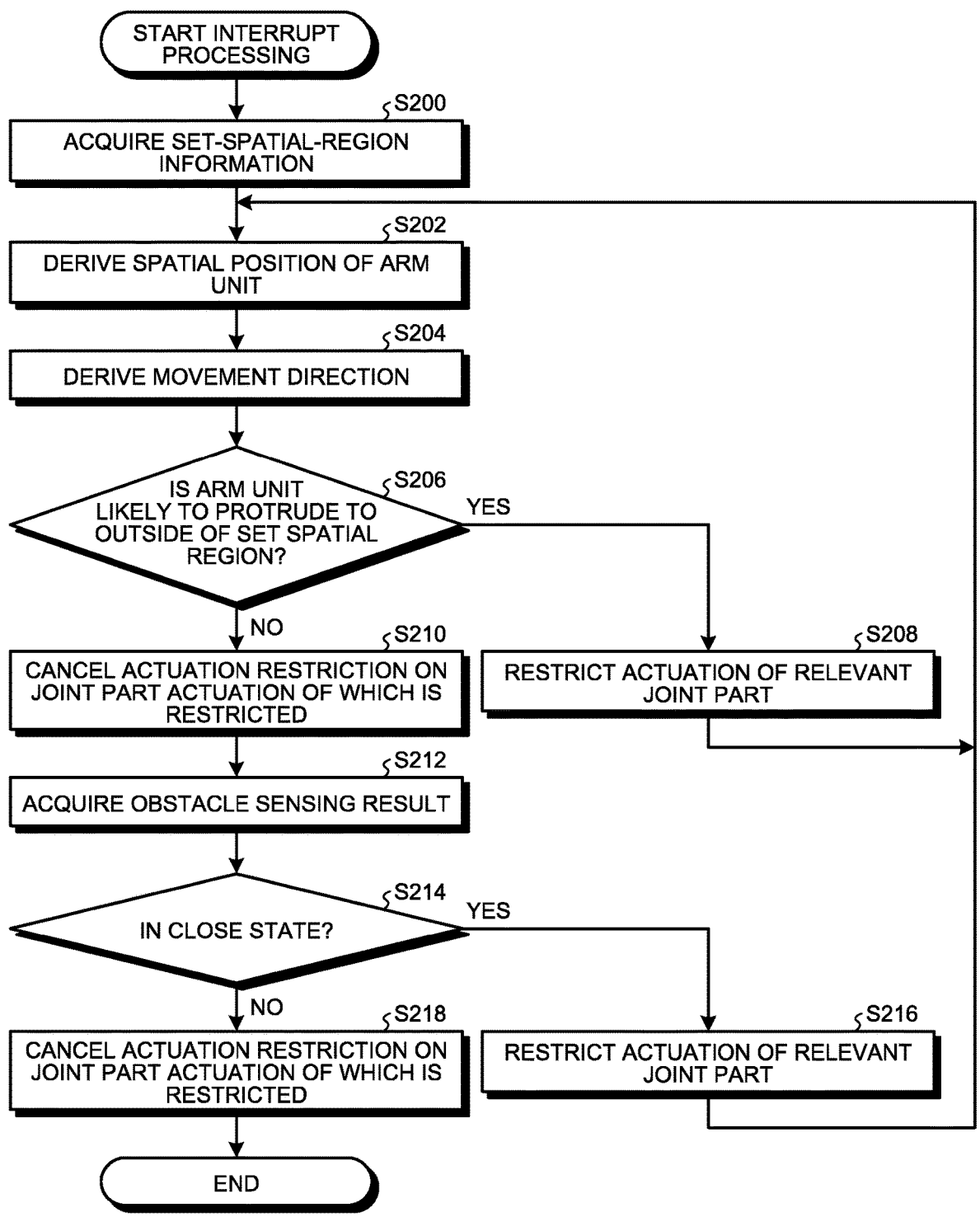
FIG. 10 is a flowchart illustrating the flow of interrupt processing according to the embodiment.

FIG. 10 is a flowchart illustrating an exemplary flow of the interrupt processing executed by the work support device 10. The work support device 10 executes the interrupt processing illustrated in FIG. 10 during the processing at steps S112 to S124 illustrated in FIG. 9.

The acquisition unit 50A acquires the set-spatial-region information of the set spatial region E from the storage unit 52 (step S200). The spatial position derivation unit 50D derives the spatial position of the arm unit 30 by applying the angle of each joint part 34, which is acquired by the acquisition unit 50A, to a stereoscopic model of the arm unit 30 that is produced in advance (step S202).

Subsequently, the movement direction derivation unit 50C derives the movement direction of each of the grasping part 32, the link part 36B, and the joint parts 34 as components included in the arm unit 30 based on a result of detection of pressure applied to the grasping part 32 and the direction of the pressure, which is acquired from the force sensor 44, and a result of detection of the joint angle of each joint part 34, which is acquired from the corresponding angle sensor 42 (step S204).

The in-region operation determination unit 50K determines whether the arm unit 30 is likely to protrude to the outside of the set spatial region E based on the spatial position of the arm unit 30 derived at step S202, the movement direction of the arm unit 30 derived at step S204, and the set spatial region E of the set-spatial-region information acquired at step S200 (step S206).

When the arm unit 30 is determined to be likely to protrude to the outside of the set spatial region E (Yes at step S206), the process proceeds to step S208.

At step S208, the brake control unit 50H specifies a joint part 34 that contributes to positional movement of a region of each part included in the arm unit 30, which is determined to be likely to protrude to the outside of the set spatial region E at step S206. Then, the brake control unit 50H controls the corresponding brake unit 41 to restrict actuation of the specified joint part 34 (step S208). Then, the process returns to the above-described step S202.

When the arm unit 30 is determined not to likely to protrude to the set spatial region E at step S206 (No at step S206), the process proceeds to step S210.

At step S210, the brake control unit 50H cancels actuation restriction on the joint part 34 actuation of which is restricted (step S210).

Subsequently, the collision determination unit 50L acquires an obstacle sensing result from the obstacle sensing unit 43 (step S212). Then, the collision determination unit 50L determines whether the arm unit 30 is close to the obstacle B based on the obstacle sensing result and the movement direction of the arm unit 30, which is derived at step S204 (step S214).

When it is determined that the arm unit 30 is close to the obstacle B (Yes at step S214), the process proceeds to step S216. At step S216, the brake control unit 50H specifies a joint part 34 that contributes to positional movement of a part of the arm unit 30 determined to be in the close state by the collision determination unit 50L. Then, the brake control unit 50H controls the corresponding brake unit to restrict actuation of the specified joint part (step S216). Then, the process returns to the above-described step S202.

When it is determined that the arm unit 30 is not close to the obstacle B (No at step S214), the process proceeds to step S218. At step S218, the brake control unit 50H cancels actuation restriction on the joint part 34 actuation of which is restricted (step S218). Then, the present routine is ended.

As described above, the work support device 10 of the present embodiment includes the arm unit 30, each brake unit 41, the state determination unit 50G, and the brake control unit 50H. The arm unit 30 includes the grasping part 32 grasping the object T, the joint parts 34, and the link parts 36 actuatably coupled through the joint parts 34. The brake unit 41 is provided to at least one of the joint parts 34 to restrict actuation of the arm unit 30. The state determination unit 50G determines the arm state of the arm unit 30. The brake control unit 50H controls the brake unit 41 to restrict actuation of the arm unit 30 in accordance with the arm state.

In this manner, the work support device 10 of the present embodiment controls the brake unit 41 provided to the arm unit 30 in accordance with the arm state of the arm unit 30, to restrict actuation of the arm unit 30.

Thus, the work support device 10 of the present embodiment can achieve improved work support.

Subsequently, an exemplary hardware configuration of the control unit 20 in the work support device 10 of the above-described embodiment will be described below.

Figure 11:
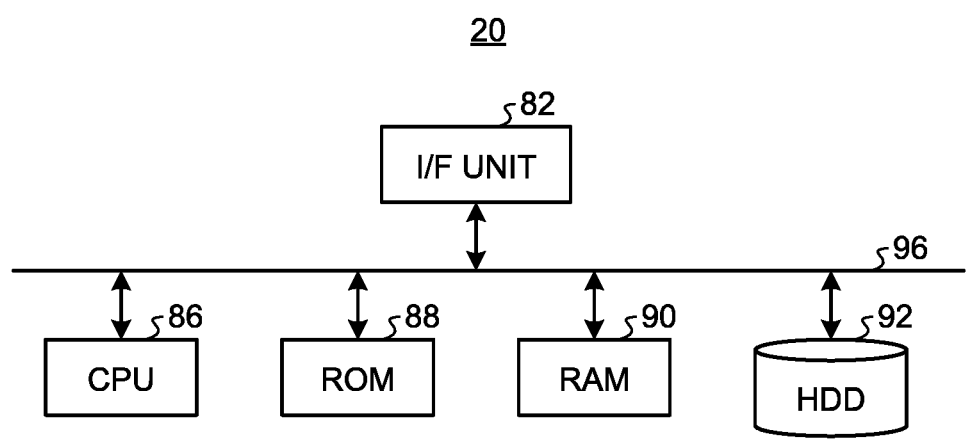
FIG. 11 is a diagram illustrating a hardware configuration according to the embodiment.

FIG. 11 is a diagram illustrating an exemplary hardware configuration of the control unit 20.

The control unit 20 has a hardware configuration of a typical computer including a control device such as a CPU 86, storage devices such as a read-only memory (ROM) 88, a random-access memory (RAM) 90, and a hard disk drive (HDD) 92, an I/F unit 82 that is an interface for various devices, and a bus 96 connecting the components.

In the control unit 20 of the above-described embodiment, each of the above-described components is implemented on the computer when the CPU 86 reads a computer program from the ROM 88 onto the RAM 90 and executes the computer program.

A computer program for executing the above-described processing executed by the control unit 20 of the above-described embodiment may be stored in the HDD 92. The computer program for executing each above-described processing executed by the control unit 20 of the above-described embodiment may be incorporated in the ROM 88 in advance and provided.

The computer program for executing the above-described processing executed by the control unit 20 of the above-described embodiment may be stored in a computer-readable storage medium such as a CD-ROM, a CD-R, a memory card, a digital versatile disc (DVD), or a flexible disk (FD) as a file in an installable or executable format to be provided as a computer program product. The computer program for executing the above-described processing executed by the control unit 20 of the above-described embodiment may be stored on a computer connected with a network such as the Internet, and downloaded and provided through the network. The computer program for executing the above-described processing executed by the control unit 20 of the above-described embodiment may be provided or distributed through a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A work support device comprising:
   an arm including a grasping part that grasps an object, a plurality of joint parts, and a plurality of link parts actuatably coupled through each joint part;
   a brake provided to at least one of the joint parts that restricts actuation of the arm;
   a linear movement slider that is provided to a scaffold capable of accommodating a worker and that supports the arm;
   a processor; and
   a memory storing instructions that, when executed by the processor, cause the processor to:
      determine a state of the arm; and
      control the brake to restrict the actuation of the arm in accordance with the state of the arm,
   wherein
      the grasping part and one of the link parts are coupled with each other through one of the joint parts, and the link parts are coupled with each other through one of the joint parts,
      the brake restricts actuation of the arm by restricting actuation of the at least one of the joint parts, and
   the memory further stores instructions that, when executed by the processor, cause the processor to:
      derive a target angle that is a joint angle of each joint part when the grasping part is positioned at a target position,
      determine, as the state, whether at least one of the joint parts has reached the target angle, and
      control the brake to restrict the actuation of the arm by restricting the actuation of the joint part determined to have reached the target angle.

2. The work support device according to claim 1, wherein the memory further stores instructions that, when executed by the processor, cause the processor to:
   determine, as the state, whether the grasping part is positioned at the target position, and
   control the brake to restrict the actuation of the arm when the grasping part is determined to be positioned at the target position.

3. The work support device according to claim 2, wherein the arm includes a detector that detects the target position, and
   the memory further stores instructions that, when executed by the processor, cause the processor to:
      determine whether the grasping part is positioned at the target position based on a result of detection by the detector.

4. The work support device according to claim 1, wherein the memory further stores instructions that, when executed by the processor, cause the processor to:
   determine, as the state, whether at least a partial region of the arm is likely to protrude from inside of a set spatial region to outside of the set spatial region, and
   control the brake to restrict the actuation of the arm when the partial region of the arm is determined to be likely to protrude to the outside of the set spatial region.

5. The work support device according to claim 1, wherein the arm includes an obstacle sensing unit that senses an obstacle, and
   the memory further stores instructions that, when executed by the processor, cause the processor to:
      determine, as the state, whether at least a part of the arm is in a close state in which the part of the arm is close to the obstacle based on a result of sensing by the obstacle sensing unit, and
      control the brake to restrict the actuation of the arm when the part of the arm is determined to be in the close state.

6. The work support device according to claim 5, wherein the arm includes a force sensor that detects the direction of pressure applied to the arm, and the memory further stores instructions that, when executed by the processor, cause the processor to:
determine whether the part of the arm is in the close state based on a result of detection by the force sensor and a result of the sensing by the obstacle sensing unit.

7. The work support device according to claim 1, wherein at least one of the joint parts is horizontally rotatable, and at least one of the joint parts is vertically rotatable.

8. The work support device according to claim 1, wherein one of the link parts and the grasping part are coupled with each other through one of the joint parts, and
the joint part is horizontally and vertically rotatable.

9. The work support device according to claim 1, wherein the memory further stores instructions that, when executed by the processor, cause the processor to:
move the grasping part of the arm to a target position;
receive a switching instruction to perform switching between a manual mode in which the arm is manually moved and an automatic mode in which the arm is moved to the target position under control of the processor; and
when a switching instruction to the automatic mode is received, control a drive unit configured to drive the joint parts of the arm to move the grasping part to the target position.

10. The work support device according to claim 9, wherein a plurality of the drive units is provided to the respective joint parts.

11. The work support device according to claim 1, wherein the linear movement slider is provided to an outer frame member of the scaffold and movably supports the arm.

12. A work support method executed by a work support device including an arm including a grasping part that grasps an object, a plurality of joint parts, and a plurality of link parts actuatably coupled through each joint part, and a brake provided to at least one of the joint parts that restricts actuation of the arm, the method comprising:
determining the state of the arm; and
controlling the brake to restrict the actuation of the arm in accordance with the state of the arm,
wherein
the arm is supported by a linear movement slider that is provided to a scaffold capable of accommodating a worker,
the grasping part and one of the link parts are coupled with each other through one of the joint parts, and the link parts are coupled with each other through one of the joint parts,
the brake restricts actuation of the arm by restricting actuation of the at least one of the joint parts, and
the method further comprises:
deriving a target angle that is a joint angle of each joint part when the grasping part is positioned at a target position,
determining, as the state, whether at least one of the joint parts has reached the target angle, and
controlling the brake to restrict the actuation of the arm by restricting the actuation of the joint part determined to have reached the target angle.

13. A computer program product having a non-transitory computer readable medium including programmed instructions, wherein the instructions, when executed by a computer configured to control a work support device including an arm including a grasping part that grasps an object, a plurality of joint parts, and a plurality of link parts actuatably coupled through each joint part, and a brake provided to at least one of the joint parts that restricts actuation of the arm, cause the computer to perform:
determining the state of the arm; and
controlling the brake to restrict the actuation of the arm in accordance with the state of the arm,
wherein
the arm is supported by a linear movement slider that is provided to a scaffold capable of accommodating a worker,
the grasping part and one of the link parts are coupled with each other through one of the joint parts, and the link parts are coupled with each other through one of the joint parts,
the brake restricts actuation of the arm by restricting actuation of the at least one of the joint parts, and
the instructions further cause the computer to perform:
deriving a target angle that is a joint angle of each joint part when the grasping part is positioned at a target position,
determining, as the state, whether at least one of the joint parts has reached the target angle, and
controlling the brake to restrict the actuation of the arm by restricting the actuation of the joint part determined to have reached the target angle.

14. A work support system comprising:
an arm including a grasping part that grasps an object, a plurality of joint parts, and a plurality of link parts actuatably coupled through each joint part;
a brake provided to at least one of the joint parts that restricts actuation of the arm;
a linear movement slider that is provided to a scaffold capable of accommodating a worker and that supports the arm;
a processor; and
a memory storing instructions that, when executed by the processor, cause the processor to:
determine a state of the arm; and
control the brake to restrict the actuation of the arm in accordance with the state of the arm,
wherein
the grasping part and one of the link parts are coupled with each other through one of the joint parts, and the link parts are coupled with each other through one of the joint parts,
the brake restricts actuation of the arm by restricting actuation of the at least one of the joint parts, and
the memory further stores instructions that, when executed by the processor, cause the processor to:
derive a target angle that is a joint angle of each joint part when the grasping part is positioned at a target position,
determine, as the state, whether at least one of the joint parts has reached the target angle, and
control the brake to restrict the actuation of the arm by restricting the actuation of the joint part determined to have reached the target angle.

* * * * *